US009870468B1

(12) United States Patent
Soquet (10) Patent No.: US 9,870,468 B1
(45) Date of Patent: Jan. 16, 2018

(54) SYSTEM AND METHOD FOR SEGREGATING DATA IN A DYNAMIC PROGRAMMING LANGUAGE

(71) Applicant: Marvell International Ltd., Hamilton (BM)

(72) Inventor: Patrick Soquet, Chastre (BE)

(73) Assignee: MARVELL INTERNATIONAL LTD., Hamilton (BM)

( * ) Notice: Subject to any disclaimer, the term of this patent is extended or adjusted under 35 U.S.C. 154(b) by 172 days.

(21) Appl. No.: 14/838,680

(22) Filed: Aug. 28, 2015

Related U.S. Application Data

(60) Provisional application No. 62/079,335, filed on Nov. 13, 2014.

(51) Int. Cl.
  G06F 21/10  (2013.01)
  G06F 21/53  (2013.01)
  G06F 9/44   (2006.01)

(52) U.S. Cl.
  CPC ............... *G06F 21/53* (2013.01); *G06F 8/31* (2013.01)

(58) Field of Classification Search
  None
  See application file for complete search history.

(56) References Cited

U.S. PATENT DOCUMENTS

2012/0311708 A1* 12/2012 Agarwal .............. G06F 21/55
                                                    726/24
2013/0160120 A1* 6/2013 Malaviya ............ G06F 21/53
                                                    726/23
2016/0164960 A1* 6/2016 Marinelli ............. H04L 67/32
                                                    709/201
2017/0091279 A1* 3/2017 Shah .................... H04L 63/10

OTHER PUBLICATIONS

Sahu et al, "Securing IoT devices using JavaScript based Sandbox", May 2016, IEEE International Conference on Recent Trends in Electronics Information Communication Technology, p. 1476-1482.*
Rubin et al, "Mobile Code Security", Nov./Dec. 1998, IEEE Internet, p. 30-34.*
Phung et al, "A Two-Tier Sandbox Architecture for Untrusted JavaScript", Jun. 13, 2012, JSTools'12, ACM, p. 1-10.*
Cao et al, "Virtual Browser: a Virtualized Browser to Sandbox Third-party JavaScripts with Enhanced Security", May 2012, ASIACCS'12, ACM, p. 1-12.*

* cited by examiner

Primary Examiner — Christopher Revak (57) ABSTRACT

Systems and methods are for segregating data and code implemented in a dynamic language, where the segregated data and code operate in an environment, where the environment and the segregated data and code are controlled using a common dynamic language. The environment is implemented in the common dynamic language, the environment including a framework, the framework including a plurality of properties. A visible framework property is identified that is visible to applications. An invisible framework property is identified that is not visible to the applications. A first application is implemented in a first sandbox within the environment, wherein the first application is implemented in the common dynamic language, wherein the first application is unable to access the invisible framework property, and wherein the first application is able to access the visible framework property.

20 Claims, 9 Drawing Sheets

SYSTEM AND METHOD FOR SEGREGATING DATA IN A DYNAMIC PROGRAMMING LANGUAGE

CROSS-REFERENCE TO RELATED APPLICATIONS

This application claims priority to U.S. Provisional Application No. 62/079,335, filed Nov. 13, 2014, entitled "XS Sandbox: JavaScript by Both Sides," the entirety of which is herein incorporated by reference.

TECHNICAL FIELD

The technology described herein relates generally to software programming and more particularly to segregation of untrusted data and/or code in a programming environment.

BACKGROUND

Software code provides commands to a computer system, causing the computer system to perform actions, such as performing a computation, printing a data value to a screen, or saving a user entered value to a disk. In an ideal environment, computer programs and applications, comprising of collections of lines of software code, perform beneficial operations for a user, such as performing complex computations, quickly performing repetitive tasks, or entertaining the user (e.g., via a game). Unfortunately, software code can also be damaging to a system, resulting in a loss of data, unauthorized access to data, or harm to hardware of a system running the software code. Such damaging code can be intentionally malicious (e.g., viruses, worms, Trojan horses, etc.). Harmful code can also be introduced to a system in more benign ways, such as part of software code development. For example, bugs or errors can be unintentionally included in software code and run on a system by mistake, without any ill intent. However, the damage to a system can be just as significant as that imparted by malicious code.

SUMMARY

Systems and methods are for segregating data and code implemented in a dynamic language, where the segregated data and code operate in an environment, where the environment and the segregated data and code are controlled using a common dynamic language. The environment is implemented in the common dynamic language, the environment including a framework, the framework including a plurality of properties. A visible framework property is identified that is visible to applications. An invisible framework property is identified that is not visible to the applications. A first application is implemented in a first sandbox within the environment, wherein the first application is implemented in the common dynamic language, wherein the first application is unable to access the invisible framework property, and wherein the first application is able to access the visible framework property.

As another example, a computer-implemented system for segregating data and code in a dynamic language, where an environment and the segregated data and code operating in the environment are controlled using a common dynamic language includes one or more processors and a computer-readable medium, encoded with instructions in the common dynamic language, which when executed by the one or more processors, causes the system to implement the environment in the common dynamic language, the environment including a framework, the framework including a plurality of properties. A visible framework property is identified that is visible to applications. An invisible framework property is identified that is not visible to the applications. A first application is implemented in a first sandbox within the environment, wherein the first application is implemented in the common dynamic language, wherein the first application is unable to access the invisible framework property, and wherein the first application is able to access the visible framework property.

As a further example, a computer-readable medium encoded with instructions, which when executed by one or more processors of a system, causes the system to perform operations for segregating data and code implemented in a dynamic language, where the segregated data and code operate in an environment, where the environment and the segregated data and code are controlled using a common dynamic language. In the operations, the environment is implemented in the common dynamic language, the environment including a framework, the framework including a plurality of properties. A visible framework property is identified that is visible to applications. An invisible framework property is identified that is not visible to the applications. A first application is implemented in a first sandbox within the environment, wherein the first application is implemented in the common dynamic language, wherein the first application is unable to access the invisible framework property, and wherein the first application is able to access the visible framework property.

DETAILED DESCRIPTION

Figure 1:
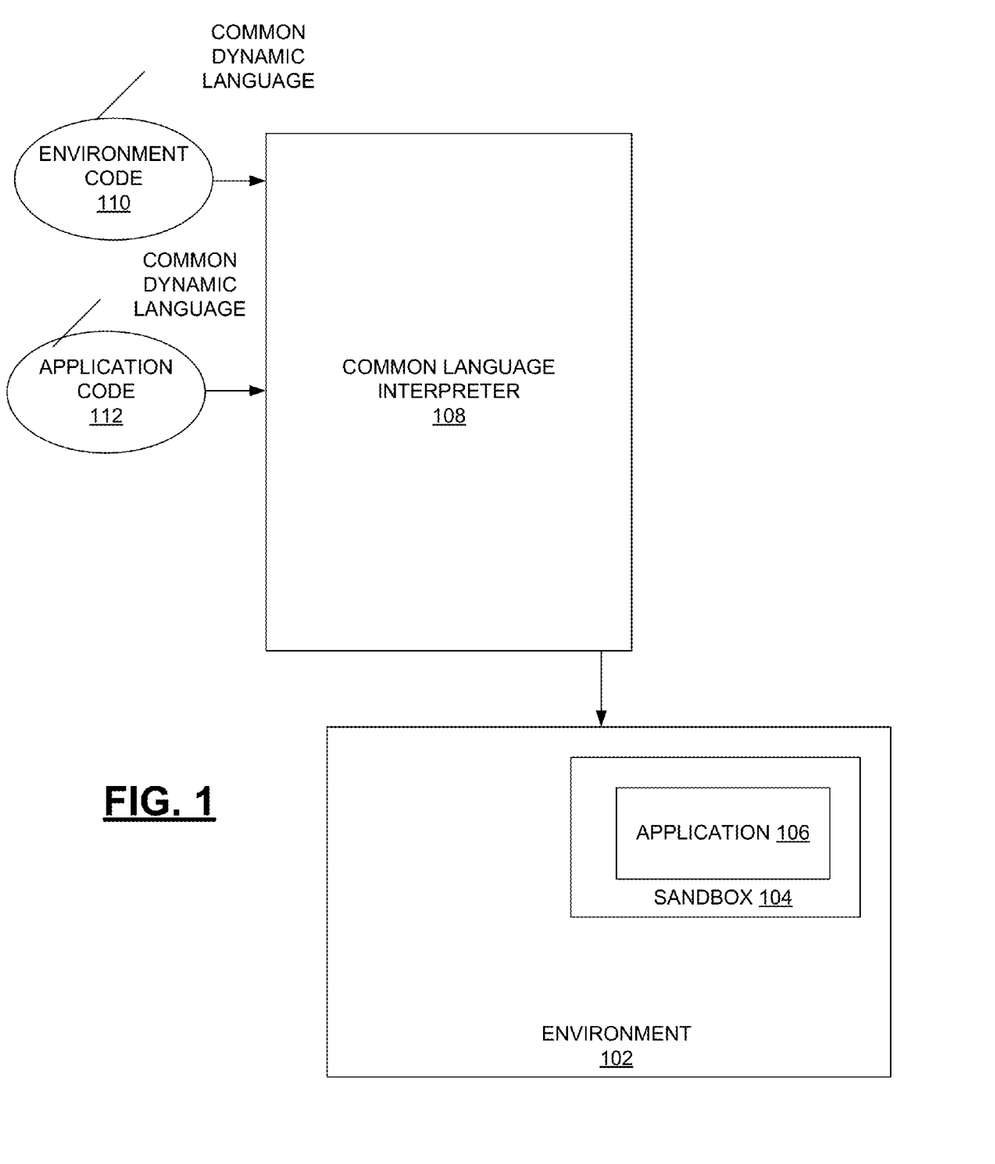
FIG. 1 is a diagram depicting an environment that is configured to segregate code and/or data of a dynamic language in a sandbox.

FIG. 1 is a diagram depicting an environment that is configured to segregate code and/or data of a dynamic language in a sandbox, according to one embodiment. As used herein, "segregating code and/or data" refers to making that code or data (e.g., properties) visible to certain applications while being invisible or inaccessible to other applications. A sandbox is a mechanism for executing untrusted code in a secure environment to prevent that untrusted code from harming a device (e.g., a smartphone on which the untrusted code is operating). A sandbox allows users to run applications but to prevent those applications from being harmful to other applications or the system on which those applications are being run. A sandbox implements rules and controls that limit entities (e.g., data, properties, hardware) that an application operating inside the sandbox is able to access. By enforcing those rules and controls, the sandbox is able to limit the application's sphere of influence, and thus, the damage that the application is able to inflict.

Certain dynamic programming languages are less susceptible to system damage caused by buggy or malicious code. For example, JavaScript was developed as a web programming language intended to be executed within a web browser application that is programmed in another language, such as C or C++. Properly programmed, such a web browser would provide containment for the JavaScript operating inside, preventing the JavaScript code from affecting entities that it should not. The web browser environment uses the host language (e.g., C, C++) to define which features are available to the dynamic language scripts.

JavaScript's popularity has greatly increased in recent years, resulting in applications and environments being entirely programmed in JavaScript. The transition in purposes for JavaScript has introduced some issues that the language was not intended to handle (e.g., because these issues were intended to be handled by the encapsulating web browser). For example, having the environment being programmed in the same dynamic language as applications being programmed therein introduces certain complexities that should be handled to ensure safe system operation.

Systems and methods as described herein take advantage of a characteristic of dynamic programming languages that enables sandbox segregation of untrusted data and/or code controlled using a same (common) dynamic language as the underlying environment. A dynamic language, such as JavaScript, utilizes runtime type checking, where a value can be any type. In such a language where every property is untyped, even functions are untyped. All code is, thus, essentially just properties. By segregating data, one accordingly segregates code.

FIG. 1 is a diagram depicting an environment 102 developed using a dynamic language according to one embodiment. The environment 102 includes a sandbox 104. The sandbox 104 further includes an application 106, programmed in the same dynamic language as the environment 102. The sandbox implements rules and controls that limit entities (e.g., properties of the environment 102 and other applications operating in the environment) that the sandbox application 106 is permitted to affect. A common language interpreter 108 receives environment code 110, programmed in the common dynamic language, and uses that environment code 110 to implement the environment. The common language interpreter 108 further receives application code 112, also programmed in the common dynamic language, and uses the application code 112 to implement the application 106 within the sandbox 104 of the environment.

Figure 2:
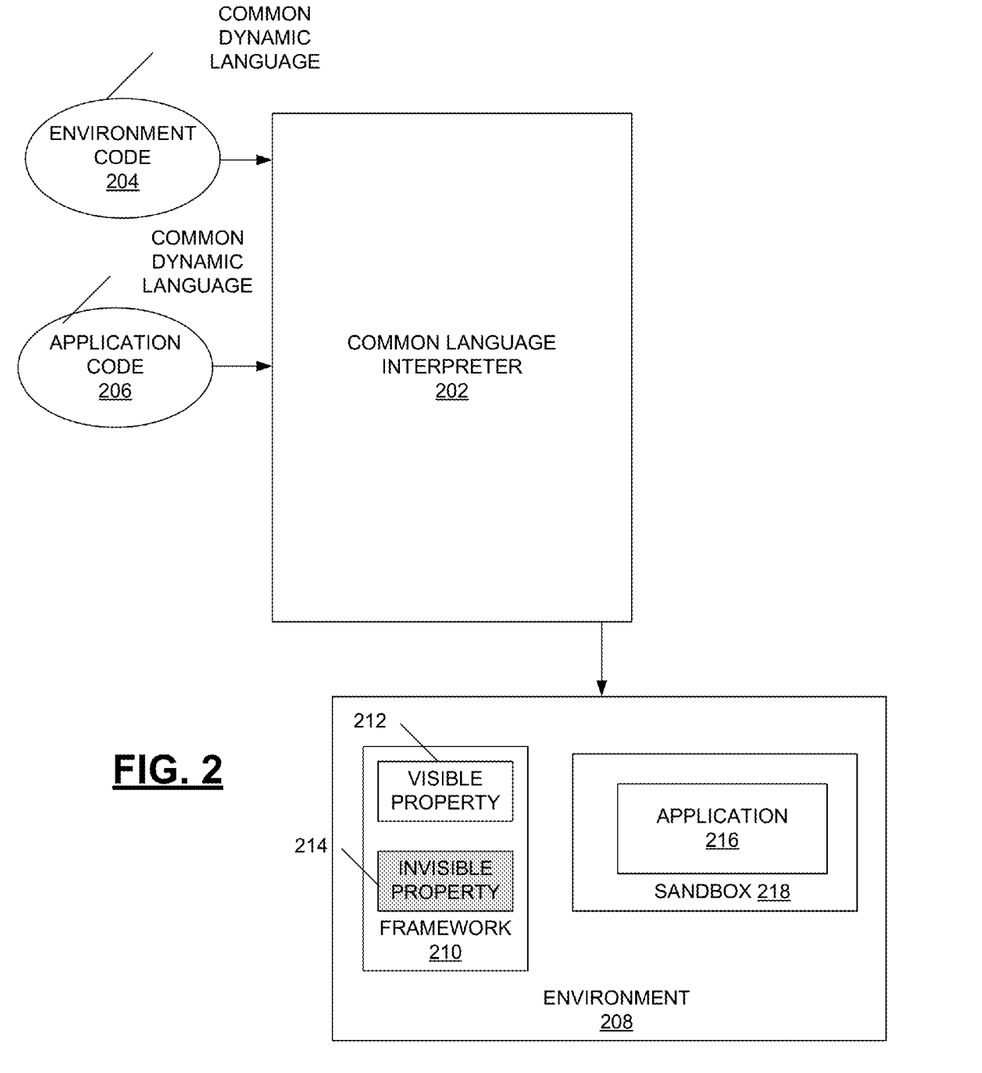
FIG. 2 is a diagram depicting an ability of a framework developer or other user to decide, on a property-by-property basis if desired, which features are visible to applications.

FIG. 2 is a diagram depicting a mechanism that enables a framework developer or other user to decide, on a property-by-property basis, which properties are visible to applications, according to one embodiment. Such visible properties define the programming interface of the framework of the environment. Similarly, as described above with respect to FIG. 1, a common language interpreter 202 receives environment code 204 and application code 206 programmed in a common dynamic language. The interpreter 202 utilizes the environment code 204 to implement an environment 208 that includes a framework 210. The framework 210 includes a plurality of properties 212, 214. Property 212 is identified as a visible framework property that is visible to applications. Property 214 is identified as an invisible framework property that is not visible to applications. The interpreter 202 further uses the application code 206 to implement a first application 216 in a first sandbox 218. The first application is able to access the visible framework property 212 but is unable to access the invisible framework property 214.

Because certain dynamic languages, such as JavaScript, allow creation of properties at runtime, the application 216 could create a property that would clash with an invisible property of the framework 210. To avoid unwanted dependencies between the framework and applications beyond the designated programming interface, which could result in detrimental side effects or openings for malicious activity, the environment 208 allows the application 216 to create such clashing properties, but makes them invisible to the framework 210. Thus, it is possible for an object to have two properties with the same name, one invisible to applications 216, and one invisible to the framework 210. Each of those objects can exist simultaneously inside and outside the sandbox 218, without conflict.

Figure 3:
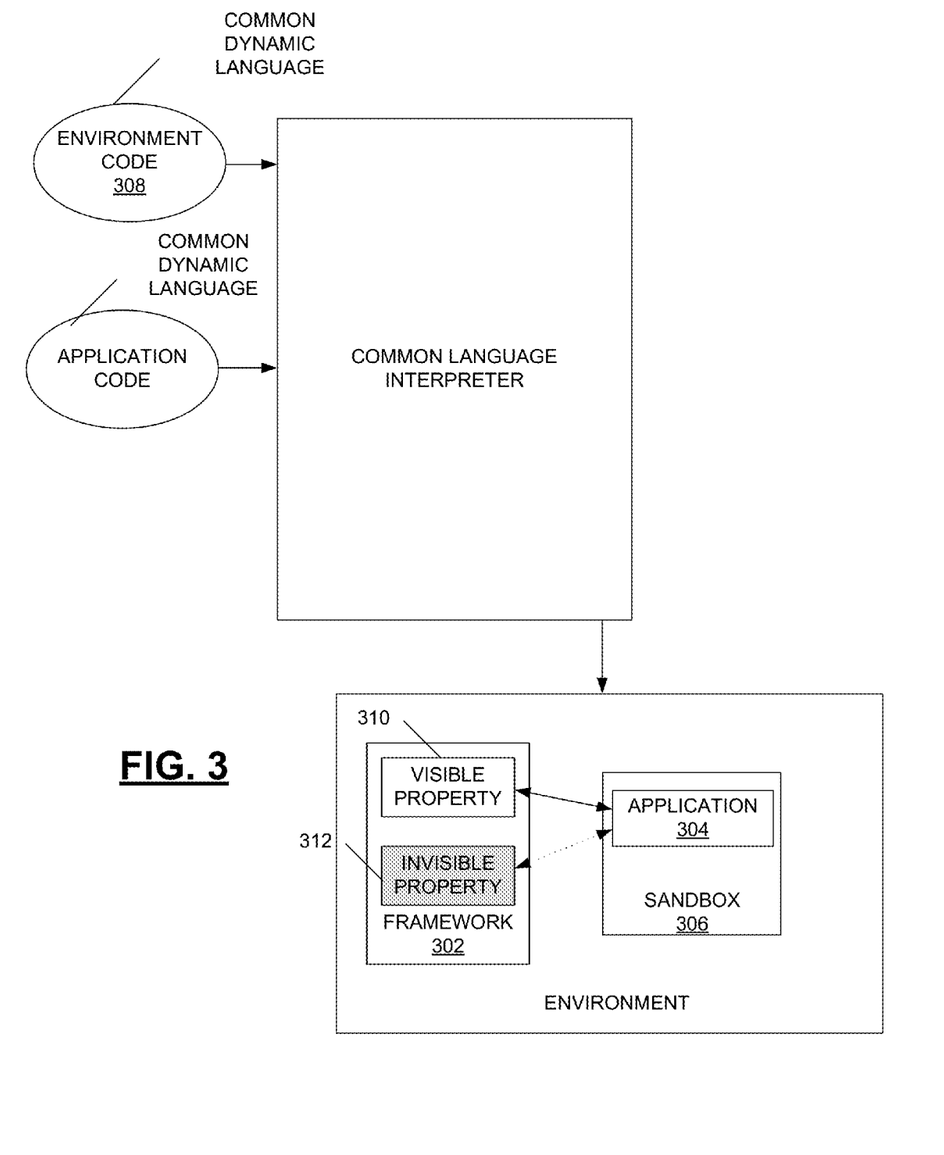
FIG. 3 is a diagram depicting visibility of framework properties to an application operating within an environment sandbox.

FIG. 3 is a diagram depicting visibility of framework properties to an application operating within an environment sandbox. In one example, grammars define which properties of a framework 302 of an environment are visible or invisible to applications 304 operating in a sandbox 306. Properties of the environment code 308 are utilized to build the sandbox 306, the programming interface between the framework 302 and the application 304 and its scripts. In the example of FIG. 3, a first framework property 310 is designated as being visible to applications operating in sandboxes (e.g., sandbox 306). The ability to view and modify the visible property 310 is indicated by the solid line. A second framework property 312 is designated as being invisible to applications operating in sandboxes. That lack of an ability of the application 304 to view or modify the invisible property 312 is indicated by the dashed line.

In one embodiment of the disclosure, the following grammar is utilized to implement two framework properties, a first being visible to applications operating inside a sandbox, and a second being invisible to applications operating in the sandbox (i.e., script="false").

```
<!--grammar-->
<object name="foo">
   <string name="visible" value="foo"/>
   <string name="invisible" value="foo" script="false"/>
</object>
//script
trace(foo.visible)//foo
trace(foo.invisible)//undefined
```

In one embodiment, a library extends the specification of the object prototype to allow the framework to test if a property can be used by scripts with Object.prototype.isScriptable( ):

```
<function name="test">
   if (this.isScriptable("foo")
      trace("foo can be used by scripts")
</function>
```

Figure 4:
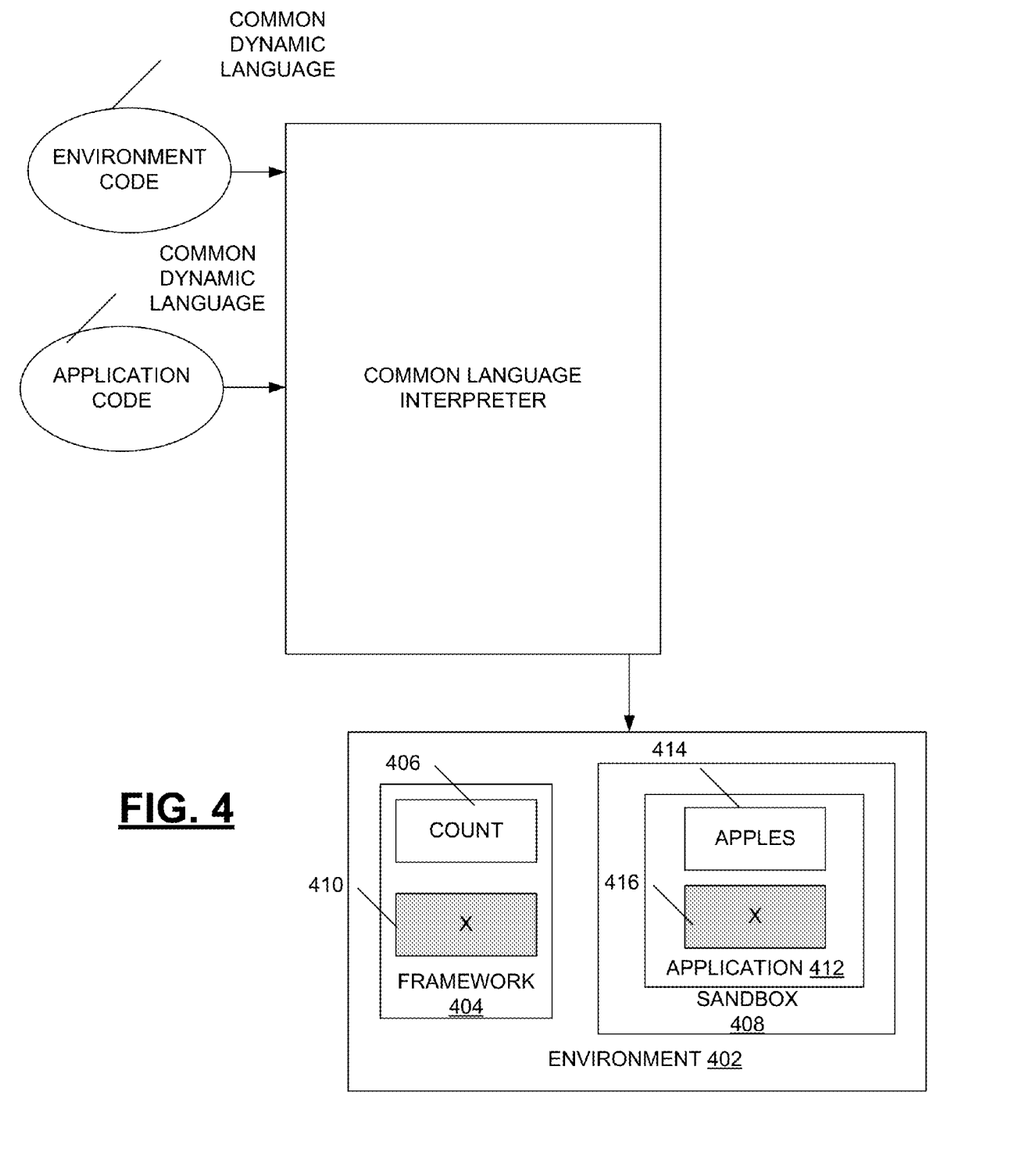
FIG. 4 is a diagram depicting a framework and an application operating in a sandbox that have conflicting property names.

As mentioned above, the framework and application property visibility features of the systems and methods described herein enable common naming of certain properties without conflict. FIG. 4 is a diagram depicting a framework and an application operating in a sandbox that have conflicting property names, according to one embodiment. A framework 402 operating in an environment 404 includes two properties. A first property 406, named "count", is visible to applications operating in a sandbox 408. A second property 410, named "X", is invisible to applications operating in that sandbox 408. An application 412 operating in the sandbox 408 in the environment 402 also contains two properties. A first property 414, named "apples", is visible to entities outside of the sandbox 408, while a second property 416, named "X", is invisible to entities outside of the sandbox.

Figure 5:
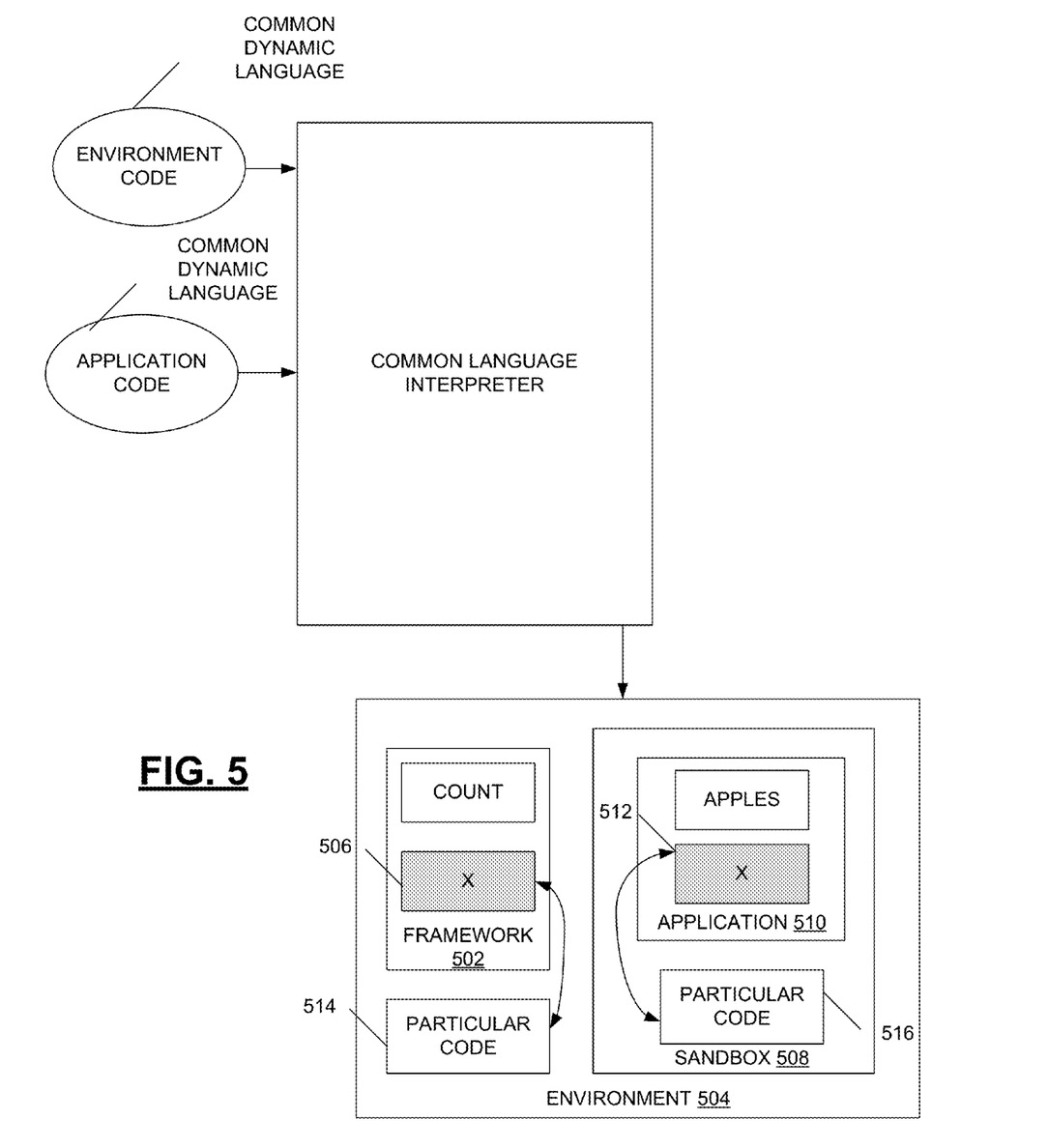
FIG. 5 is a diagram depicting access to different instances of property X by identical code portions, depending on the locations of those code portions.

The visibility features described herein enable software codes to reference a property named X without conflict, despite the environment including two properties 410, 416 by that name. The visibility features enable access of the correct property X depending on the location of code that references property X. FIG. 5 is a diagram depicting access to different instances of property X by identical code portions, depending on the locations of those code portions, according to one embodiment. As described above with respect to FIG. 4, a framework 502 of the environment 504 includes a property X 506 that is identified as being invisible to applications operating in sandbox 508. An application 510 operating in the sandbox 508 also includes a property named X 512 that is identified as being invisible outside of the sandbox 508. An identical portion of code, particular code 514, 516, is executed in the environment 504 and in the sandbox 508, respectively. When the particular code 514 is executed in the environment 504, the framework 502 version of property X 506 is accessed. In contrast, when that exact same particular code 516 is executed in the sandbox 508, the application 510 version of property X 512 is accessed.

Figure 6:
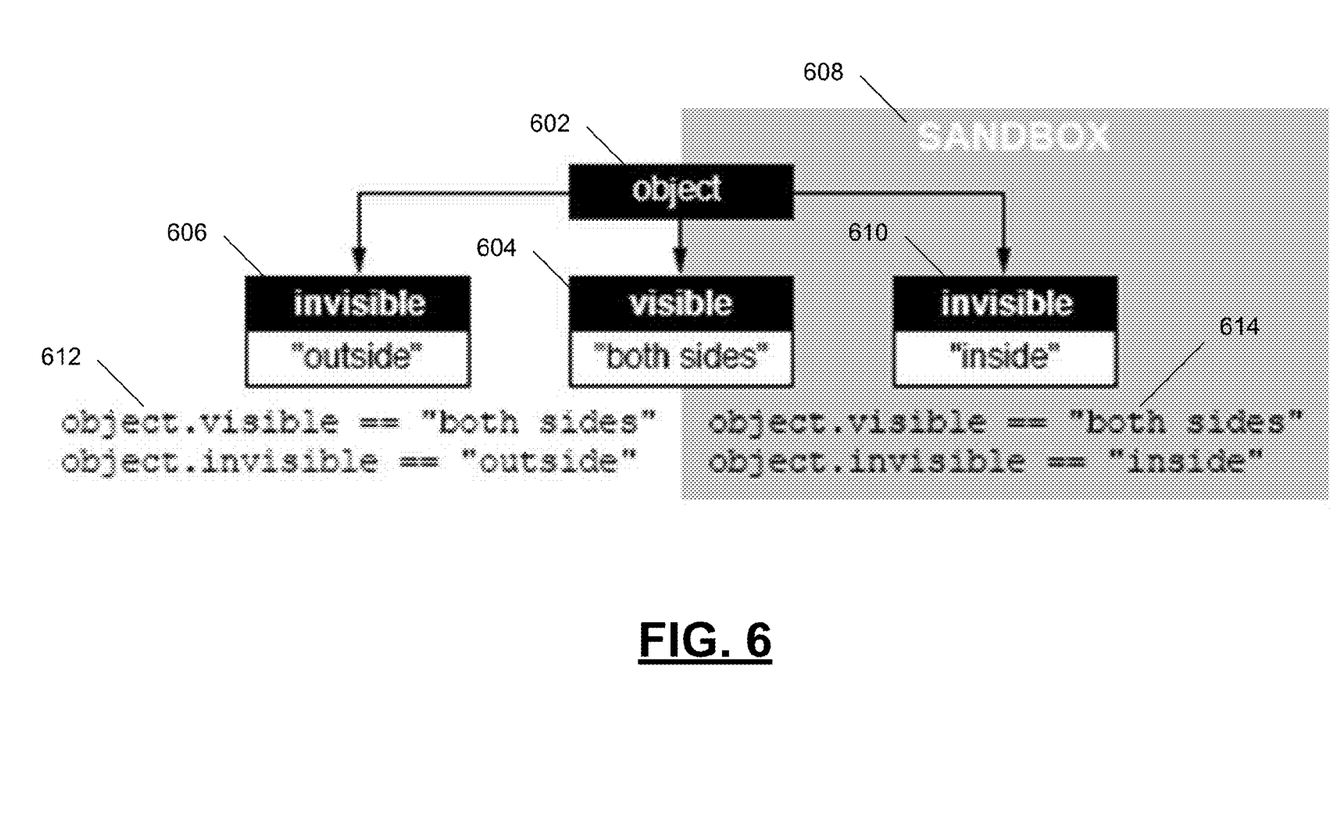
FIG. 6 is a diagram depicting an object having commonly named properties positioned inside and outside of a sandbox.

FIG. 6 is a diagram depicting an object having commonly named properties positioned inside and outside of a sandbox. An object 602 includes a first property 604 named visible. The first property 604 has a value of "both sides." A second property 606 is named invisible and is positioned outside of a sandbox 608. That second property 606 has a value of "outside." A third property 610 is positioned inside of the sandbox 608. That third property 610 of the object 602 has a value of "inside." The code is then executed, inside and outside of the sandbox to illustrate which version of properties is being accessed. At 612, object.visible is queried (i.e., referenced) outside of the sandbox 608, causing a value of "both sides" to be provided, indicating that the first property 604 is being accessed. Further, when object.invisible is queried outside of the sandbox 608, a value of "outside" is returned, indicating that the second property 606 is being accessed. The identical queries are made at 614, but from within the sandbox 608. At 614, when object.visible is queried, "both sides" is returned, indicating another access to first property 604. When object.invisible is queried inside the sandbox 608, "inside" is returned, indicating that the third property 610 is being accessed (in contrast to the second property 606).

Below is an example grammar for identifying a property as invisible to applications operating in a sandbox (i.e., script="false"):

```
<!—-grammar-->
<object name="foo">
    <string name="visible" value="foo"/>
    <string name="invisible" value="foo" script="false"/>
</object>
//script
foo.visible="goo"//the visible property is shared
foo.invisible="goo"//foo has two invisible properties
```

The library can extend the specification of the object prototype to allow the framework to use properties like if it was a script. It is sometimes convenient, for an instance to install properties at runtime that are meaningful only to scripts:

```
<function name="test" params="it">
    trace(it.sandbox.invisible)
    it.sandbox.invisible="goo"
    delete sandbox.invisible
    for (var i in it.sandbox)
        trace(it.sandbox[i])
</function>
```

The value of Object.prototype.sandbox is a handle that allows the framework to call, delete, enumerate, get and set runtime properties created by scripts.

In one embodiment of the disclosure, the library can be enabled to execute code out of the sandbox (e.g., framework code) or in the sandbox (e.g., script code) on an as-needed basis. Through function or constructor properties, framework code can call or invoke script code and vice versa. At runtime, framework code can test if it has been called by script code, directly or indirectly. The result of the test, in one example, is a number: 0 meaning called by framework code, 1 meaning called directly by script code, more than 1 meaning called indirectly by script code:

```
<function name="test">
    if (xs.script( ))
        trace("called by script code")
    else
        trace("called by framework code")
</function>
```

Figure 7:
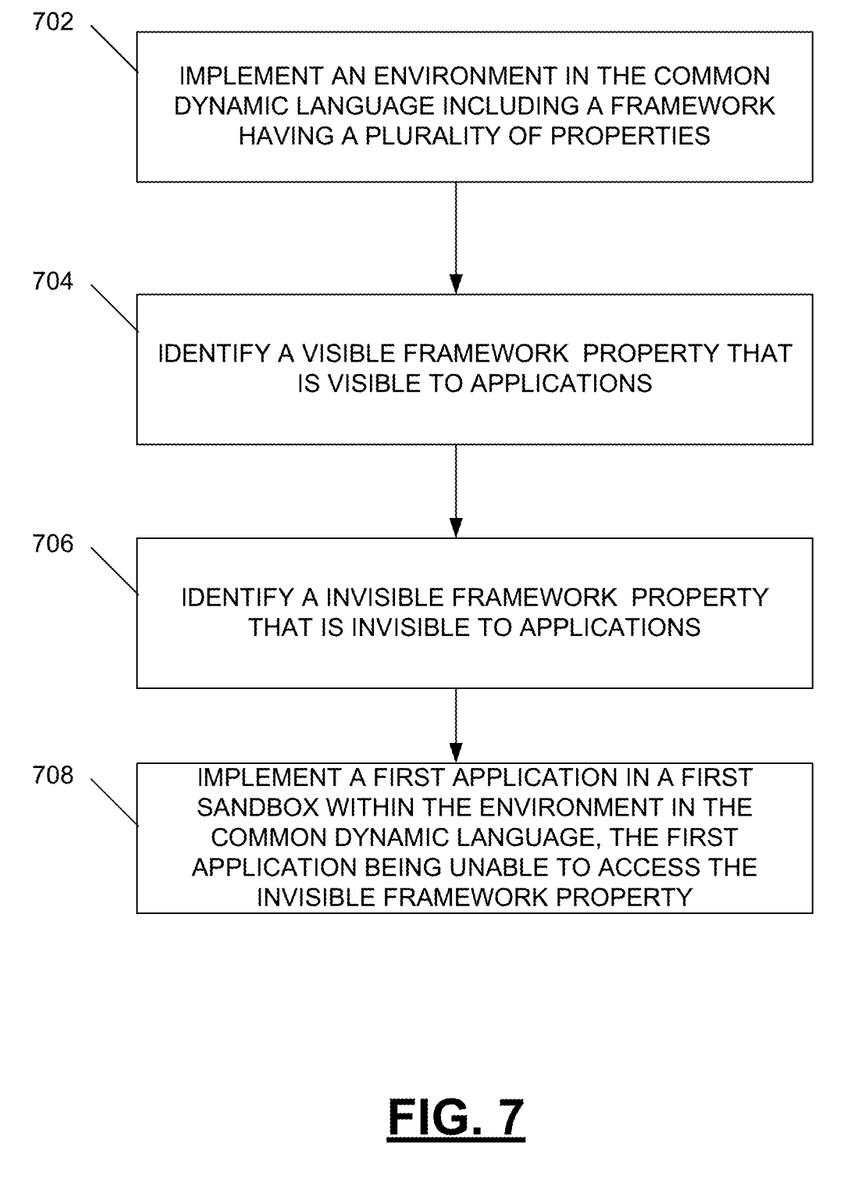
FIG. 7 is a flow diagram depicting a computer-implemented method of segregating data and code in a dynamic language, where an environment and the segregated data and code operating in the environment are controlled using a common dynamic language.

FIG. 7 is a flow diagram depicting a computer-implemented method of segregating data and code in a dynamic language, wherein the segregated data and code operate in an environment, wherein the environment and the segregated data and code are controlled using a common dynamic language. At 702, an environment is implemented in the common dynamic language, the environment including a framework, the framework including a plurality of properties. At 704, a visible framework property is identified that is visible to applications, and at 706, an invisible framework property is identified that is not visible to applications. At 708, a first application is implemented in a first sandbox within the environment, wherein the first application is implemented in the common dynamic language, wherein the first application is unable to access the invisible framework property, and the first application is able to access the visible framework property.

Figure 8A:
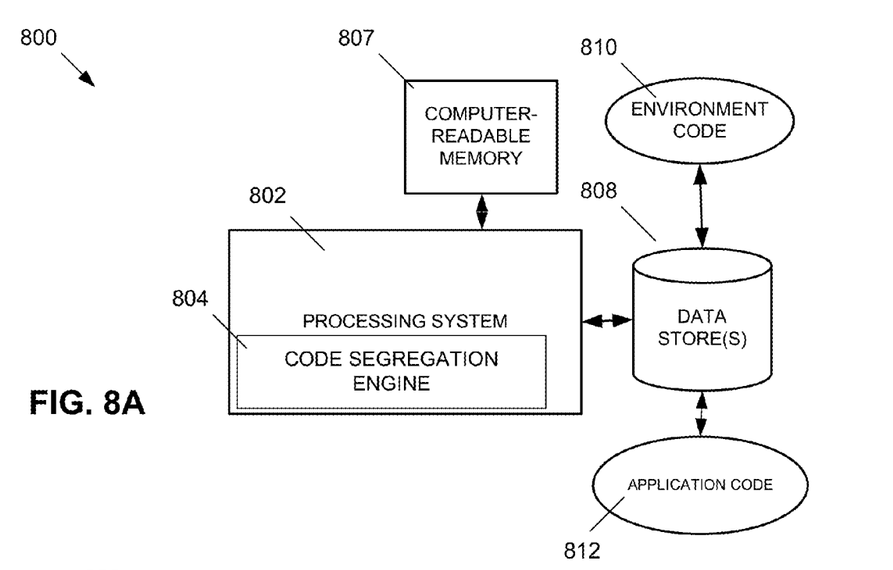
FIGS. 8A, 8B, and 8C depict example systems for implementing the approaches described herein for segregating data and code in a dynamic language.
Figure 8B:
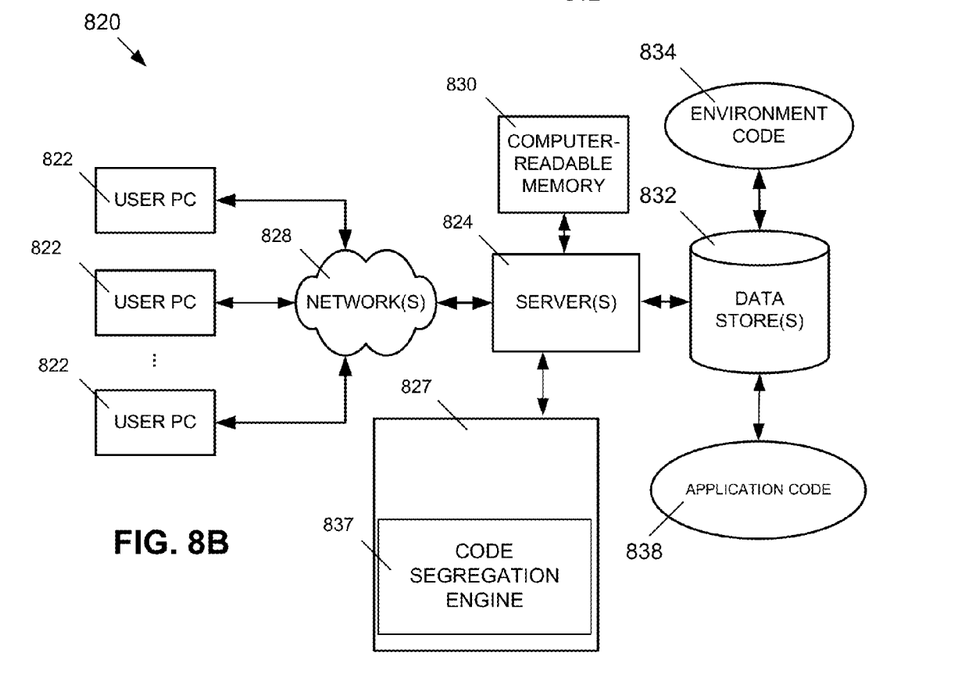
Figure 8C:
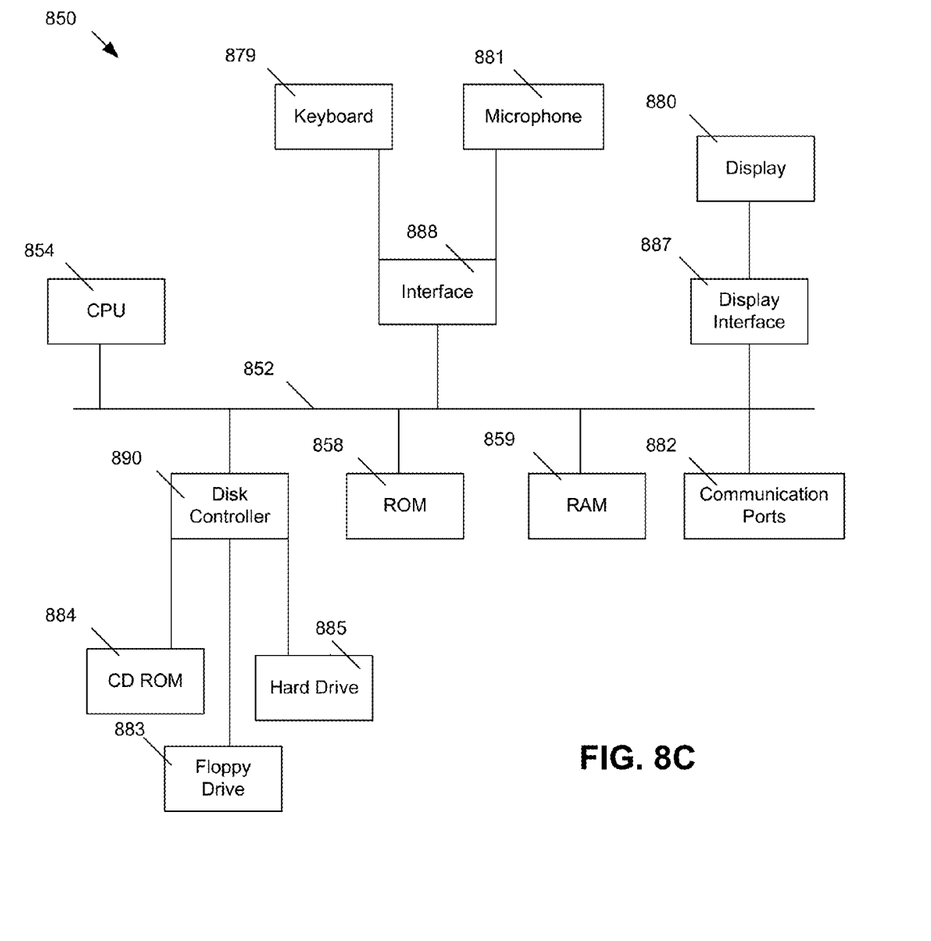

FIGS. 8A, 8B, and 8C depict example systems for implementing the approaches described herein for segregating data and code in a dynamic language. For example, FIG. 8A depicts an exemplary system 800 that includes a standalone computer architecture where a processing system 802 (e.g., one or more computer processors located in a given computer or in multiple computers that may be separate and distinct from one another) includes a code segregation engine 804 being executed on the processing system 802. The processing system 802 has access to a computer-readable memory 807 in addition to one or more data stores 808. The one or more data stores 808 may include environment code 810 as well as application code 812. The processing system 802 may be a distributed parallel computing environment, which may be used to handle very large-scale data sets.

FIG. 8B depicts a system 820 that includes a client-server architecture. One or more user PCs 822 access one or more servers 824 running a code segregation engine 837 on a processing system 827 via one or more networks 828. The one or more servers 824 may access a computer-readable memory 830 as well as one or more data stores 832. The one or more data stores 832 may include environment code 834 as well as application code 838.

FIG. 8C shows a block diagram of exemplary hardware for a standalone computer architecture 850, such as the architecture depicted in FIG. 8A that may be used to include and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may include one or more programming instructions for performing the method of segregating data and code in a dynamic language. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 807, 830, 858, 859 or data stores 808, 832, 883, 884, 888 may include one or more data structures for storing and associating various data used in the example systems for segregating data and code in a dynamic language. For example, a data structure stored in any of the aforementioned locations may be used to store data from XML files, initial parameters, and/or data for other variables described herein. A disk controller 890 interfaces one or more optional disk drives to the system bus 852. These disk drives may be external or internal floppy disk drives such as 883, external or internal CD-ROM, CD-R, CD-RW or DVD drives such as 884, or external or internal hard drives 885. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 890, the ROM 858 and/or the RAM 859. The processor 854 may access one or more components as required.

A display interface 887 may permit information from the bus 852 to be displayed on a display 880 in audio, graphic, or alphanumeric format. Communication with external devices may optionally occur using various communication ports 882.

In addition to these computer-type components, the hardware may also include data input devices, such as a keyboard 879, or other input device 881, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

For example, an environment can be implemented having multiple sandboxes, one or more application operating in each sandbox. Property visibilities can be set up for properties of applications operating in those sandboxes. In one embodiment, a sandbox application property can be indicated as visible to all, invisible to the framework, invisible to code operating in other sandboxes, or invisible to all outside of its sandbox.

It is claimed:

1. A computer-implemented method for segregating data and code implemented in a dynamic language, wherein the segregated data and code operate in an environment, wherein the environment and the segregated data and code are controlled using a common dynamic language, the method comprising:
  implementing the environment in the common dynamic language, the environment including a framework, the framework including a plurality of properties;

identify in a visible framework property that is visible to applications;
identifying an invisible framework property that is not visible to the applications; and
implementing a first application in a first sandbox within the environment, wherein the first application is implemented in the common dynamic language, wherein the first application is unable to access the invisible framework property, and wherein the first application is able to access the visible framework property.

2. The method of claim 1, wherein the common dynamic language is a language that utilizes runtime type checking.

3. The method of claim 1, wherein the invisible framework property has a name, wherein the first application includes a first application property, wherein the first application property has a name that conflicts with the name of the invisible framework property.

4. The method of claim 3, wherein the first application operating on the first application property that has a name that conflicts with the name of the invisible framework property does not result in an error based on an invisible nature of the invisible framework property.

5. The method of claim 3, wherein when a portion of code operating in the first sandbox references the conflicting name, a value associated with the first application property is accessed; and
wherein when the portion of code operating outside of the first sandbox references the conflicting name, a value associated with the invisible framework property is accessed.

6. The method of claim 5, wherein the first application property is invisible to the environment outside of the first sandbox.

7. The method of claim 1, further comprising:
implementing an object, wherein the object has an outside property that is visible in the environment but is invisible in the first sandbox, wherein the outside property has a particular name;
wherein the object has a sandbox property that is visible in the first sandbox but is invisible in the environment, wherein the sandbox property also has the particular name.

8. The method of claim 7, wherein the outside property and the sandbox property of the object exist outside and inside of the sandbox, respectively, and operate without conflict.

9. The method of claim 1, further comprising:
implementing a second application in a second sandbox within the environment, the second application being implemented in the common dynamic language, the second application including a second application property; and
preventing the first application from accessing the second application Property of the second application operating in the second sandbox.

10. The method of claim 1, further comprising:
receiving, for each of a plurality of framework properties, an identification of whether the framework property is visible or invisible to applications operating in sandboxes;
wherein the framework is implemented according to the received identifications.

11. The method of claim 1, wherein the first application is implemented using a first code that is untrusted to the environment.

12. A computer-implemented system for segregating data and code in a dynamic language, wherein an environment and the segregated data and code operating in the environment are controlled using a common dynamic language, the system comprising:
a non-transitory computer-readable medium, encoded with instructions in the common dynamic language, which when executed by one or more processors, causes the system to:
implement the environment in the common dynamic language, the environment including a framework, the framework including a plurality of properties;
identify a visible framework property that is visible to applications;
identify an invisible framework property that is not visible to the applications; and
implement a first application in a first sandbox within the environment, wherein the first application is implemented in the common dynamic language, wherein the first application is unable to access the invisible framework property, and wherein the first application is able to access the visible framework property.

13. The system of claim 12, wherein the invisible framework property has a name, wherein the first application includes a first application property, wherein the first application property has a name that conflicts with the name of the invisible framework property.

14. The system of claim 13, wherein the first application operating on the first application property that has a name that conflicts with the name of the invisible framework property does not result in an error based on an invisible nature of the invisible framework property.

15. The system of claim 13, wherein when a portion of code operating in the first sandbox references the conflicting name, a value associated with the first application property is accessed; and
wherein when the portion of code operating outside of the first sandbox references the conflicting name, a value associated with the invisible framework property is accessed.

16. The system of claim 15, wherein the first application property is invisible to the environment outside of the first sandbox.

17. The system of claim 12, wherein the computer-readable medium is further encoded with instructions, which when executed by the one or more processors, causes the system to:
implement an object, wherein the object has an outside property that is visible in the environment but is invisible in the first sandbox, wherein the outside property has a particular name;
wherein the object has a sandbox property that is visible in the first sandbox but is invisible in the environment, wherein the sandbox property also has the particular name.

18. The system of claim 17, wherein the outside property and the sandbox property of the object exist outside and inside of the sandbox, respectively, and operate without conflict.

19. The system of claim 12, wherein the computer-readable medium is further encoded with instructions, which when executed by the one or more processors, causes the system to:
receive, for each of a plurality of framework properties, an identification of whether the framework property is visible or invisible to applications operating in sandboxes;

wherein the framework is implemented according to the received identifications.

20. A non-transitory computer-readable medium encoded with instructions, which when executed by one or more processors of a system, causes the system to perform operations for segregating data and code implemented in a dynamic language, wherein the segregated data and code operate in an environment, wherein the environment and the segregated data and code are controlled using a common dynamic language, the operations comprising:
- implementing the environment in the common dynamic language, the environment including a framework, the framework including a plurality of properties;
- identifying a visible framework property that is visible to applications;
- identifying an invisible framework property that is not visible to the applications; and
- implementing a first application in a first sandbox within the environment, wherein the first application is implemented in the common dynamic language, wherein the first application is unable to access the invisible framework property, and wherein the first application is able to access the visible framework property.

* * * * *